US00RE38895E

(19) United States
(12) Reissued Patent
McLemore

(10) Patent Number: US RE38,895 E
(45) Date of Reissued Patent: Nov. 29, 2005

(54) CARGO PLATFORM OFFSET ANGLE AND TIE PLATE ASSEMBLY

(76) Inventor: Don McLemore, 450 Brown Ave., Columbus, GA (US) 31805

(21) Appl. No.: 10/611,075

(22) Filed: Jul. 2, 2003

Related U.S. Patent Documents

Reissue of:
(64) Patent No.: 6,253,981
Issued: Jul. 3, 2001
Appl. No.: 08/989,302
Filed: Dec. 12, 1997

(51) Int. Cl.[7] ..... B60R 9/06
(52) U.S. Cl. ..... 224/526
(58) Field of Search ..... 224/435, 499, 224/522, 523, 524, 525, 526; 220/4.17, 4.21, 4.24, 8, 682, 692, 693; 108/56.3; 182/223

(56) References Cited

U.S. PATENT DOCUMENTS

| | | | | | |
|---|---|---|---|---|---|
| 1,029,745 | A | * | 6/1912 | Eaton | 220/4.17 |
| 1,085,670 | A | | 2/1914 | Cronk | |
| 1,346,581 | A | | 7/1920 | Yost | |
| 1,515,996 | A | * | 11/1924 | Buchanan | 220/4.17 |
| 1,640,779 | A | | 8/1927 | Laher | |
| 1,648,094 | A | * | 11/1927 | Williams | 224/524 |
| 1,835,243 | A | | 12/1931 | Schaffert | |
| 1,838,344 | A | | 12/1931 | Wilson | |
| 1,907,268 | A | * | 5/1933 | Schwemlin | 220/693 |
| 2,060,970 | A | | 11/1936 | Belden | |
| 2,123,035 | A | * | 7/1938 | Ashley | 220/693 |
| 2,490,014 | A | | 12/1949 | De V. Brand | |
| 2,783,927 | A | * | 3/1957 | Harley | 224/435 |
| 2,809,046 | A | | 10/1957 | Andersson | |
| 3,822,801 | A | | 7/1974 | Morgan, Jr. | |
| 4,234,284 | A | | 11/1980 | Hauff | |
| 4,640,658 | A | | 2/1987 | Webb, Jr. | |
| 4,646,952 | A | | 3/1987 | Timmers | |
| 4,695,218 | A | | 9/1987 | Boyer | |
| 4,744,590 | A | | 5/1988 | Chesney | |
| 4,775,282 | A | | 10/1988 | Van Vliet | |
| 4,806,063 | A | | 2/1989 | York | |
| 4,813,584 | A | | 3/1989 | Wiley | |
| 4,844,528 | A | | 7/1989 | Johnson | |
| 4,938,399 | A | | 7/1990 | Hull et al. | |
| 5,038,983 | A | | 8/1991 | Tomososki | |
| 5,570,826 | A | * | 11/1996 | Garbes et al. | 224/524 |
| 5,676,292 | A | * | 10/1997 | Miller | 224/524 |
| 5,996,869 | A | * | 12/1999 | Belinky et al. | 224/510 |
| 6,006,973 | A | * | 12/1999 | Belinky et al. | 224/510 |

OTHER PUBLICATIONS

Masterbuilt Mfg. Inc. brochure (not dated—but estimated around 1992) showing a single piece cargo platform attached to a Ford Bronco and having forward and aft vertical frame structures (Item 1).

Masterbuilt brochure indicating "HH 8/96" and illustrating a "Hitch Haul ® Wheel Free Carrier" attached to a Chrysler Town & Country vehicle (Item 2a).

Masterbuilt Hitch Haul® carrier owner's manual for models HP2, HP2C and HP125, with Apr. 21, 1997 indicated (Item 2b).

Two–page Masterbuilt brochure entitled Hitch–Haul® wheel free carrier "a division of Masterbuilt" with enlarged view of the carrier attached to the back of a red Ford Bronco and positioned above a photo of an "Allegro" recreationg vehicle with the same carrier mounted (no date indicated) (Item 2c).

(Continued)

*Primary Examiner*—Stephen K. Cronin
(74) *Attorney, Agent, or Firm*—Smith, Gambrell & Russell

(57) ABSTRACT

A cargo carrier with two platform sections that are assembled together. Opposite metal side walls of the platform sections are bent to an offset angle to enable either end of the platforms to slide up against each other and be bolted together. This makes for easy assembly and less hardware. A tie plate, and bolts are provided on the top of the juxtaposed interior ends of the platform sections for the securing of the two platform sections together.

40 Claims, 3 Drawing Sheets

OTHER PUBLICATIONS

Four–page Masterbuilt brochure entitled outdoor cooking made simple and illustrating a carrier similar to that in 2© in the lower left hand corner adjacent a "7 in 1" patio cooker (date not indicated) (Item 2d).

Two–page document from Masterbuilt entitled "Hitch-Haul® Wheel Free Carrier" listing model numbers and suggested retail prices for H2P, HP125 and HP2C (date not indicated) (Item 2e).

Two Masterbuilt brochures having a first paragraph starting with the phrase "Outdoorsmen can now transport" listing various models (including model #HP2) and designating various model prices (date not indicated) (Item 2f).

Six–page Masterbuilt brochure indicating "© 1998" and designating "The Original Masterbuilt" Hitch–Haul ® Wheel Free Carrier (Item 3).

* cited by examiner

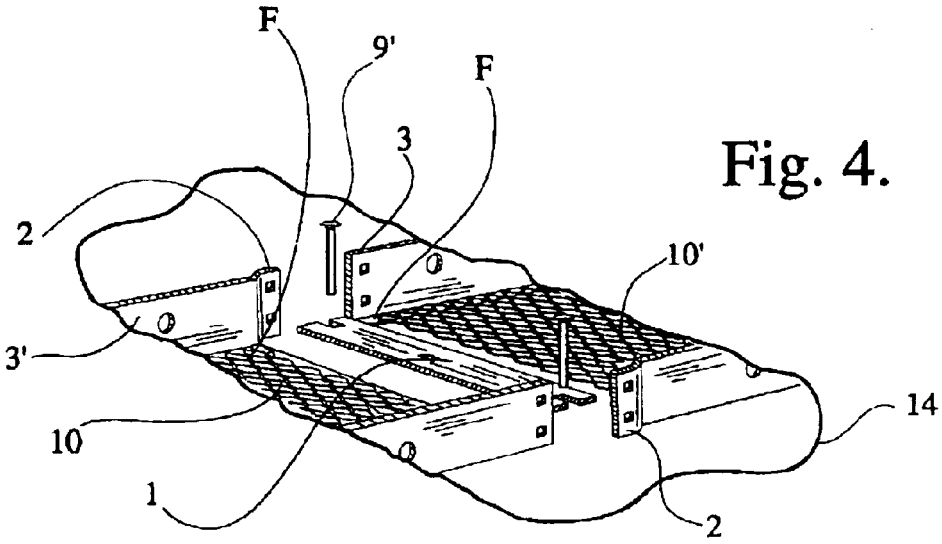
Fig. 4.
Fig. 5.
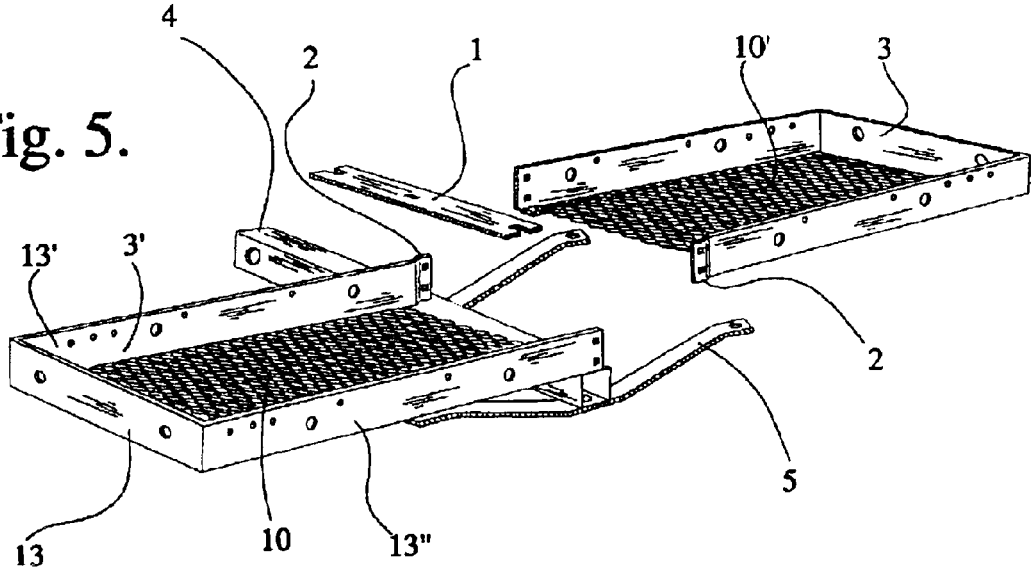

CARGO PLATFORM OFFSET ANGLE AND TIE PLATE ASSEMBLY

Matter enclosed in heavy brackets [ ] appears in the original patent but forms no part of this reissue specification; matter printed in italics indicates the additions made by reissue.

CROSS-REFERENCE TO RELATED APPLICATION

Not applicable

STATEMENT REGARDING FEDERALLY SPONSORED RESEARCH OR DEVELOPMENT

Not applicable

BRIEF SUMMARY OF THE INVENTION

The invention is for a cargo carrier. It makes for easy assembly while adding extra strength to the cargo platform. Also, it requires less hardware to assemble.

The open end of the platform's sections are formed at such an angle that the two platform sections can be bolted together and the tie plate can be placed on top of the platform completing the assembly process.

BRIEF DESCRIPTION OF THE SEVERAL VIEWS OF THE DRAWING

FIG. 4—Is a close up view of how the offset angle allows each platform section to come together on either end and where the tie plate assembly goes.

FIG. 5—Is an overall view of the cargo carrier not assembled.

DETAILED DESCRIPTION OF THE DRAWING

Figure 1:
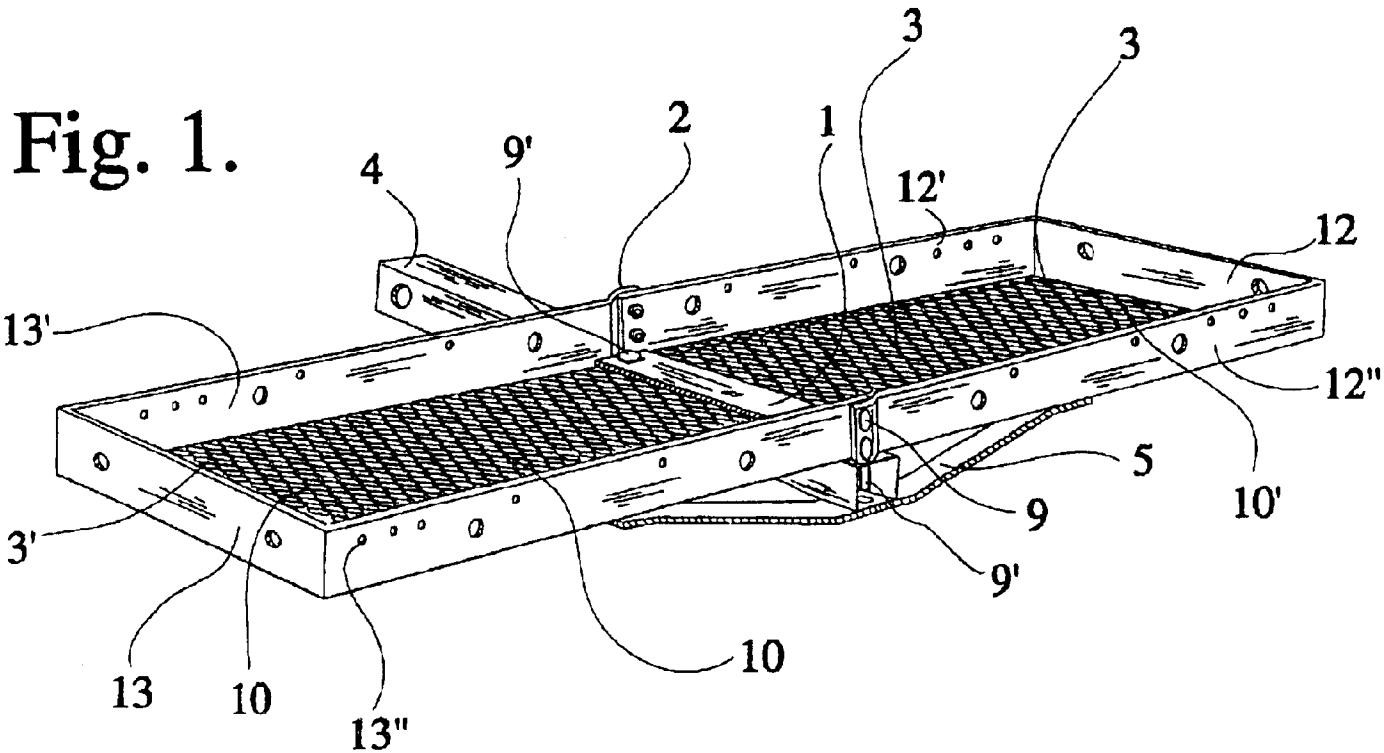
FIG. 1—Is an overall view of the completely assembled cargo carrier

Reference number 1 represents the tie plate, which connects the two platform sections 3, 3' together in the middle through the receiver bar 4 and the bridge supports 5.

Reference number 2 shows the bent offer angle for engaging side walls of the platform sections 3, 3' which arrangement allows the two platform sections to come together in an interengaging manner so as to keep the platform sections flush and square.

Figure 2:
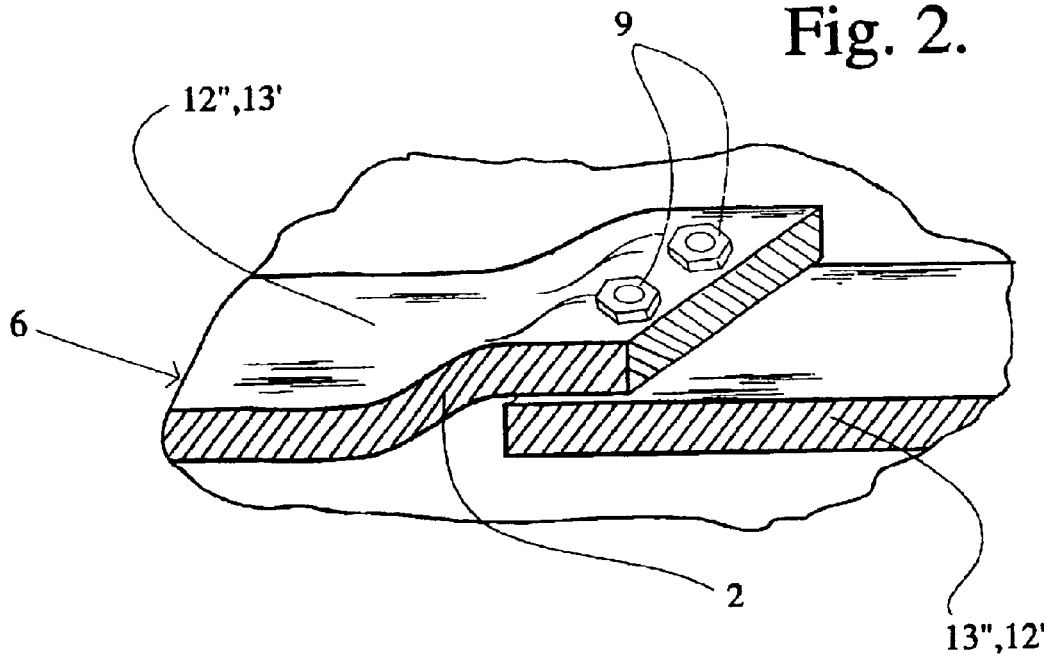
FIG. 2—Is an enlarged view showing the platform's offset angle assembly
Figure 3:
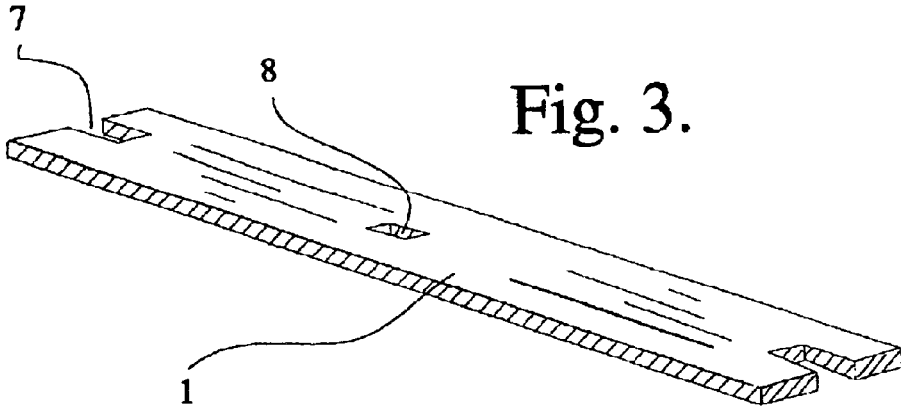
FIG. 3—Is a view of the tie plate

Reference numbers 3, 3' represent the platform sections which together form the cargo platform. When both platform section are connected there is provided a cargo carrier platform for use with a vehicle. As shown, the preferred embodiment for platform sections 3.3' features an end wall 13 and two side walls 13', 13" with, in the illustrated embodiment, side wall 13' of platform section 3' having bent offset angle 2 at its free end and the other side wall 13' having a straight free end extension. Platform section 3 features end wall 12 and two side walls 12' and 12" with side wall 12' having bent offset angle 2, receiving the straight free end extension of side wall 13", and with the straight free end extension of side will 12' being received by offset angle 2 of sidewall 13'. This interrelationship provides for a flush arrangement to the interior surfaces of the side walls of the interconnected platform sections (see the flush arrangement for the lower surfaces in FIG. 2 provided by the offset 2). As shown particularly in FIGS. 4 and 5, platform sections 3 and 3' include mesh sheeting 10, 10'. FIGS. 4 and 5 also illustrate platform sections 3 and 3' each having an inwardly extending flange F which provides a support surface for the side edging of mesh sheeting 10, 10'. Each platform section also includes an open interior end defined by the free edges of the respective sidewalk and mesh sheeting Reference number 4 represents the receiver bar, this connects the cargo carrier to the receiver hitch on the back of a vehicle.

Reference number 5 represents bridge supports, they help in enhancing the strength of the platform, helping distribute the weight of cargo evenly across the platform sections.

Reference number 6 designates a view window helping to isolate the interengaging or nested arrangement between the offset end of a first platform section receiving the free end of a second platform section.

Reference 1 represents the notched ends in the tie plate 1 for providing flexibility when completing the assembly process of the two platform sections 3, 3'.

Reference 8 shows intermediate notch 8 in the tie plate 1.

During an assembly process, the two platform sections 3, 3' are secured together by placing the open ends of the platform sections together. On one side of each platform section the material has been offset or bent outward at an angle so the two platforms sections can be bolted together by bolts 9 as best shown in FIG. 2. The offset in the angle allows the two platform halves of sections to remain square or flush and appear as one solid platform. The tie plate adds to the structural integrity of the final assembly by securing the two platform sections together by way of the tie plate being positioned in the middle between the platform sections and extending over interior edges of the inner cargo support regions. The tie phase ends are notched out to give flexibility when bolting tie plate 1 to receiver bar 4 via bolts 9', with the tie plate, mesh flooring, and receiver bar being in a stacked relationship.

The offset angle shown provided on one side of each of the open ends of the platform sections (shown in an opposite free end arrangement) with the material of the side walls having been bent outward to form an interior offset or angle. This arrangement allows the two halves of the platform to be bolted together so as to keep the sides of the platforms flat and square when assembled. The tie plate has a pair of punched open end boles, one on each end, for bolts to be placed through for easy assembly.

The offset angled bend and tie plate are thus constructed to tie the two halves of the cargo platform together for added strength and ease of assembly.

What is claimed is:

1. A cargo carrier for attachment to a vehicle, comprising:

a first platform section having an end wall and first and second side walls extending off from opposite ends of said end wall and having respective free ends, said first platform section further comprising an inner cargo support region extending between said side walls;

a second platform section having an end wall and first and second side walls extending off from opposite ends of the end wall of said second platform section and having respective free ends, said second platform section further comprising an inner cargo support region extending between the side walls of said second platform section;

and wherein the free end of the first side wall of said first platform section and the free end of the first side wall of said second platform are in a first nested relationship upon assembly due to an offset provided in the free end of one of the nested first side walls and an extension provided in the free end of an opposite one of the nested first side walls which extension is designed for reception in said offset;

and wherein the free end of the second side wall of said first platform section and the free end of the second side wall of said second platform are in a second nested relationship upon assembly due to an offset provided in the free end of one of the nested second side walls and an extension provided in the free end of an opposite one of the nested second side walls, which extension of the nested second side walls is designed for reception in the offset of the nested second side walls;

a receiver bar having a first end for securement to a vehicle and an elongated main body extending to a second end along a direction of elongation;

a tie plate, said tie plate being dimensioned so as to extend in the direction of elongation of the receiver bar between the free ends forming said first and second nested relationships, and said tie plate having a width in a direction transverse to the direction of elongation of the receiver bar sufficient to extend to an interior portion of the inner cargo support region of said first platform section and an interior portion of the inner cargo support region of said second platform section upon the side walls being in said first and second nested relationship;

said tie plate, the interior portions of the inner cargo support regions of said first and second platform sections and the main body of said receiver bar being in a stacked relationship upon assembly;

first and second bridge supports spaced apart with respect to the direction of elongation of said receiver bar and each having in intermediate section to contact with the receiver bar and outward ends extending to supporting contact with respective platform sections at location transversely outward of said tie plate;

a plurality of fasteners which, upon assembly of the cargo carrier, fasten respective free ends of the first and second nested relationships and the tie plate to the receiver bar.

2. A cargo carrier as recited in claim 1, wherein the offset of the first nested relationship is provided in the fist side wall of said first platform section and the offset of the second nested relationship is provided in the second side wall of said second platform section.

3. A cargo carrier as recited in clam 1, wherein the end wall and two side walls of each of said first and second platform sections extend vertically away from a respective one of said inner cargo support region and each offset is formed so as to maintain an interior surface of the side walls of said first platform section in a common plane with an interior surface of a conducting side wall of said second platform section.

4. A cargo carrier at recited is claim 1, wherein said tie plate has an elongated end slot for receipt of one of said fasteners upon securement of said tie plate to said receiver bar.

5. A cargo carrier as recited in claim 1, wherein said bridge supports are fastened to said receiver bar and spaced apart therealong.

6. A cargo carrier as recited in claim 1 wherein the side walls of said first and second platform sections include a bottom internally extending flange portion which provides an underlying support to the inner cargo support regions of said platform sections.

7. A cargo carrier as recited in claim 6 wherein said inner cargo support regions are comprised of mesh sheeting.

8. A cargo as recited in claim 6 wherein each of the free ends of said side walls are free of the bottom, internally extending flange portion.

9. A cargo carrier as recited in claim 2 wherein said fasteners are bolt fasteners and said free ends in said first and second nested relationships include vertically offset bolt holes.

10. A cargo carrier is recited to claim 1 wherein the first end of said receiver bar includes, a receiver hitch connection and with a hole.

11. A cargo carrier as recited is claim 1 wherein said tie plate has two end fastener notches formed therein and the end fastener notches are elongated in a direction of elongation of said tie plate.

12. A cargo amen as recited is claim 1 wherein said receiver bar includes a faster hole vertically aligned with the intermediate section of said first bridge support.

13. A cargo carrier comprising:

a first platform section which includes an end wall and two side walls which together define a first U-shape frame structure having an interior open frame end, said first platform section further comprising a first mesh sheet having side edging supported by an inwardly extending flange of said first flange structure and an interior sheet edge at the open frame end of said first frame structure;

a second platform section which includes an end wall and two side walls which together define a second U-shaped frame structure having an interior frame end, said second platform section further comprising a second mesh sheet having side edging supported by an inwardly extending loop of said second U-shape frame structure and an interior sheet edge at the open frame end of said second frame structure;

a first of the two side walls of said first frame structure being in a nested arrangement with a first of the two side walls of said second frame structure by way of an offset angle bend provided in a free end of one of the nested first side walls and an extension provided in the free end of an opposite one of the nested first side walls, which extension is designed for reception in said offset;

a second of the two side walls of said first frame structure being in a nested arrangement with a second of the two side walls of the said second frame structure by way of an offset angle bend provided in a free end of one of the nested second side walls and an extension provided in the free end of an opposite one of the nested second side walls and designed for reception is the offset of the nested second side walls;

a receiver bar having a vehicle correction end and a main body extending to a free end;

a tie plate, said tie plate being positioned over the interior sheet edges of said first second mesh sheets and being fastened with a fastener to said receiver bar with said interior sheet edges being positioned between said tie bar and a main body of said receiver bar; and first and second bridge supports each having an intermediate section contacting said receiver bar and said first bridge section having outward ends contacting respective first side walls of said first and second frame structures and said second bridge section having outward ends contacting respective second sidewalls of said first and second frame structures.

14. A cargo carrier as recited in claim 13, wherein the offset of the first nested arrangement is provided in the first side wall of said first platform section and the offset of the second nested arrangement is provided in the second side wall of said nested platform section.

15. A cargo carrier as recited an claim 13, wherein the end wall and two side walls of each of said first and second platform sections extend vertically away from a respective one of said inner cargo support regions and each offset is provided to maintain an interior surface of the side walls of said first platform section in a common plane with an interior surface of a contacting side wall of said second platform section.

16. A cargo carrier as recited in claim 13, wherein said tie plate has a pair of elongated end slots for receipt of fasteners upon securement of said tie plate to said receiver bar.

17. A cargo carrier as recited in claim 13 wherein said bridge supports are fastened to said receiver bar and spaced apart therealong.

18. A cargo carrier as recited in claim 13 wherein the flange of each of said first and second platform sections is a bottom internally extending flange portion with respect to the respective side walls which provides mesh sheet underlying support.

19. A cargo as recited in claim 18 wherein each of the free ends of said side walls in the nested arrangements are free of the bottom, internally extending flange.

20. A cargo carrier as recited in claim 13 wherein the first end of said receiver bar includes a receiver which connection end with a hole.

*21. A cargo carrier for attachment to a vehicle, comprising:*

*a first platform section having an end wall and first and second side walls extending off from opposite ends of said end wall and having respective free ends, said first platform section further comprising an inner cargo support region extending between said side walls;*

*a second platform section having an end wall and first and second side walls extending off from opposite ends of the end wall of said second platform section and having respective free ends, said second platform section further comprising an inner cargo support region extending between the side walls of said second platform section;*

*and wherein the free end of the first side wall of said first platform section and the free end of the first side wall of said second platform are releasably secured together;*

*and wherein the free end of the second side wall of said first platform section and the free end of the second side wall of said second platform are releasably secured together;*

*a receiver bar having a first end for securement to a vehicle and an elongated main body extending to a second end alone a direction of elongation;*

*a tie plate, said tie plate being dimensioned so as to extend in the direction of elongation of the receiver bar between the free ends of said first and second platform sections, and said tie plate having a width in a direction transverse to the direction of elongation of the receiver bar sufficient to overlap an interior portion of the inner cargo support region of said first platform section and an interior portion of the inner cargo support region of said second platform section upon the side walls of said first and second platform sections being releasably secured together;*

*said tie plate, the interior portions of the inner cargo support regions of said first and second platform sections and the main body of said receiver bar being in a stacked relationship upon assembly and said tie plate being an independent component releasably secured to the receiver bar;*

*first and second bridge supports spaced apart with respect to the direction of elongation of said receiver bar and each having an intermediate section in contact with the receiver bar and outward ends extending to supporting contact with respective platform sections at locations transversely outward of said tie plate;*

*a plurality of fasteners which, upon assembly of the cargo carrier, fasten respective free ends of the first and second platforms and the tie plate to the receiver bar.*

*22. A cargo carrier as recited in claim 21, wherein said tie plate has an elongated end slot for receipt of one of said fasteners upon securement of said tie plate to said receiver bar.*

*23. A cargo carrier as recited in claim 21, wherein said bridge supports are fastened to said receiver bar and spaced apart therealong.*

*24. A cargo carrier as recited in claim 21, wherein said inner cargo support region for each of said platforms is comprised of a respective continuous sheet of material.*

*25. A cargo carrier as recited in claim 24, wherein said continuous sheet of material is meshed sheeting.*

*26. A cargo carrier as recited in claim 21, wherein said fasteners are bolt fasteners and said free ends in said first and second platform sections include vertically offset bolt holes.*

*27. A cargo carrier as recited in claim 21, wherein the first end of said receiver bar includes a receiver hitch connection end with a hole.*

*28. A cargo carrier as recited in claim 21, wherein said tie plate has two end fastener notches formed therein and the end fastener notches are elongated in a direction of elongation of said tie plate.*

*29. A cargo carrier as recited in claim 21, wherein said receiver bar includes a fastener hole vertically aligned with the intermediate section of said first bridge support.*

*30. A cargo carrier as recited in claim 21, wherein the side walls of said first and second platform sections include a bottom, internally extending flange portion which provides an underlying support to the inner cargo support regions of said platform sections.*

*31. A cargo as recited in claim 30, wherein each of the free ends of said side walls are free of the bottom, internally extending flange portion.*

*32. A cargo carrier as recited in claim 31 wherein said tie plate extends over said flange portions.*

*33. A cargo carrier as recited in claim 21, wherein said tie plate is of a length which extends from one interior side of said assembled platform to an opposite interior side and is releasably fastened by removable fasteners.*

*34. A cargo carrier comprising:*

*a first platform section which includes an end wall and two side walls which together define a first U-shape frame structure having an interior open frame end, said first platform section further comprising a first sheet having side edging supported by an inwardly extending flange of said first flange structure and an interior sheet edge at the open frame end of said first frame structure;*

*a second platform section which includes an end wall and two side walls which together define a second U-shaped frame structure having an interior frame end, said second platform section further comprising a*

*second sheet having side edging supported by an inwardly extending flange of said second U-shape frame structure and an interior sheet edge at the open frame end of said second frame structure;*

*a first of the two side walls of said first frame structure being releasable secured together with a first of the two side walls of said second frame structure;*

*a second of the two side walls of said first frame structure being releasably secured together with a second of the two side walls of the said second frame structure;*

*a receiver bar having a vehicle connection end and a main body extending to a free end;*

*a tie plate, said tie plate being positioned over the interior sheet edges of said first and second sheets and being an independent component that is releasably fastened with a fastener to said receiver bar, with said interior sheet edges being positioned between said tie plate and a main body of said receiver bar; and*

*first and second bridge supports each having an intermediate section contacting said receiver bar and said first bridge section having outward ends contacting respective first side walls of said first and second frame structures and said second bridge section having outward ends contacting respective second sidewalls of said first and second frame structures.*

*35. A cargo carrier as recited in claim 34, wherein said tie plate has a pair of elongated end slots for receipt of fasteners upon securement of said tie plate to said receiver bar.*

*36. A cargo carrier as recited in claim 34, wherein said tie plate has an intermediate hole between said elongated end slots.*

*37. A cargo carrier as recited in claim 34, wherein said tie plate extends over portions of said flanges.*

*38. A cargo as recited in claim 37, wherein each of the free ends of said side walls are in a nested arrangement and are free of the bottom, internally extending flanges.*

*39. A cargo carrier as recited in claim 34, wherein the first end of said receiver bar includes a receiver hitch connection end with a hole.*

*40. A cargo carrier as recited in claim 34, wherein said bridge supports are fastened to said receiver bar and spaced apart therealong.*

* * * * *